(12) United States Patent
Uchida

(10) Patent No.: US 8,933,583 B2
(45) Date of Patent: Jan. 13, 2015

(54) WIRELESS POWER SUPPLY SYSTEM, WIRELESS POWER TRANSMITTING DEVICE, AND WIRELESS POWER RECEIVING DEVICE

(75) Inventor: Akiyoshi Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/231,757

(22) Filed: Sep. 13, 2011

(65) Prior Publication Data

US 2012/0001485 A1 Jan. 5, 2012

Related U.S. Application Data

(63) Continuation of application No. PCT/JP2009/056459, filed on Mar. 30, 2009.

(51) Int. Cl.
*H02J 1/00* (2006.01)
*H02J 5/00* (2006.01)
*H02J 7/02* (2006.01)

(52) U.S. Cl.
CPC . *H02J 5/005* (2013.01); *H02J 7/025* (2013.01)
USPC ................................................ 307/11

(58) Field of Classification Search
USPC .................................... 307/104, 11
See application file for complete search history.

(56) References Cited

U.S. PATENT DOCUMENTS

| | | | |
|---|---|---|---|
| 7,522,878 B2* | 4/2009 | Baarman | 455/41.1 |
| 8,097,984 B2* | 1/2012 | Baarman et al. | 307/104 |
| 2004/0130915 A1* | 7/2004 | Baarman | 363/21.02 |
| 2007/0042729 A1 | 2/2007 | Baaman et al. | |
| 2007/0222542 A1 | 9/2007 | Joannopoulos et al. | |
| 2008/0266748 A1 | 10/2008 | Lee | |
| 2008/0278264 A1* | 11/2008 | Karalis et al. | 333/219 |
| 2009/0058189 A1* | 3/2009 | Cook et al. | 307/104 |
| 2009/0184950 A1* | 7/2009 | Furuta et al. | 345/211 |
| 2009/0243397 A1* | 10/2009 | Cook et al. | 307/104 |

(Continued)

FOREIGN PATENT DOCUMENTS

| | | |
|---|---|---|
| AU | 2010-200044 A1 | 1/2006 |
| CA | 2615123 A1 | 1/2007 |

(Continued)

OTHER PUBLICATIONS

Partial English Translation of WIPO Reference 2009/031639 dated Mar. 12, 2009.

(Continued)

*Primary Examiner* — Jared Fureman
*Assistant Examiner* — Duc M Pham
(74) *Attorney, Agent, or Firm* — Staas & Halsey LLP

(57) ABSTRACT

A wireless power supply system includes: a wireless power transmitting device configured to include a variable resonant circuit having a variable-controllable resonant frequency characteristic, and to transmit electric power wirelessly via the variable resonant circuit; a power transmission control unit configured to variably control the resonant frequency characteristic of the variable resonant circuit; and a plurality of wireless power receiving devices configured to include respective unique resonant circuits having respective unique resonant frequency characteristics which are different to each other, and to wirelessly receive power from the wireless power transmitting device by a magnetic field resonance mode arising as a result of the unique resonant circuit tuning to a resonant frequency of the variable resonant circuit.

8 Claims, 8 Drawing Sheets

(56) References Cited

U.S. PATENT DOCUMENTS

| | | | |
|---|---|---|---|
| 2010/0213770 A1 | 8/2010 | Kikuchi | |
| 2011/0007701 A1* | 1/2011 | To et al. ................. | 370/329 |
| 2011/0101790 A1* | 5/2011 | Budgett ................... | 307/104 |
| 2012/0153733 A1* | 6/2012 | Schatz et al. ............ | 307/104 |

FOREIGN PATENT DOCUMENTS

| | | |
|---|---|---|
| CN | 101340113 A | 1/2009 |
| EP | 1779550 A1 | 5/2007 |
| EP | 1902505 A2 | 3/2008 |
| JP | 2002-218680 | 8/2002 |
| JP | 2008-508842 | 3/2008 |
| JP | 2008-206327 | 9/2008 |
| JP | 2009-501510 | 1/2009 |
| JP | 2009-213352 | 9/2009 |
| WO | 2006/011769 | 2/2006 |
| WO | WO 2006/011769 A1 | 2/2006 |
| WO | 2007/008646 | 1/2007 |
| WO | WO 2007/008646 A2 | 1/2007 |
| WO | 2008/081405 A1 | 7/2008 |
| WO | 2008/118178 A1 | 10/2008 |
| WO | 2009/009559 A1 | 1/2009 |
| WO | 2009/014125 | 1/2009 |
| WO | WO 2009/014125 A1 | 1/2009 |
| WO | 2009/023155 A2 | 2/2009 |
| WO | 2009/031639 | 3/2009 |
| WO | 2009/037821 | 3/2009 |
| WO | WO 2009/031639 A1 | 3/2009 |
| WO | WO 2009/037821 A1 | 3/2009 |

OTHER PUBLICATIONS

Partial English Translation of WIPO Reference 2009/014125 dated Jan. 29, 2009.

Partial English Translation of Japanese Reference 2008-206327 dated Sep. 4, 2008.

André Kurs, et al., "Wireless Power Transfer via Strongly Coupled Magnetic Resonances", Science vol. 317, Jul. 6, 2007, pp. 83-86.

International Search Report for PCT/JP2009/056459 mailed Jun. 16, 2009.

Korean Office Action issued Oct. 24, 2012 in corresponding Korean Patent Application No. 10-2011-7020672.

Chinese Office Action issued Jun. 5, 2013 in corresponding Chinese Application No. 200980158312.2.

Japanese Office Action mailed Jul. 23, 2013 in corresponding Japanese Application No. 2011-508084.

Chinese Office Action mailed Nov. 12, 2013 in corresponding Chinese Patent Application No. 200980158312.2.

Chinese Office Action issued Jun. 10, 2014 in corresponding Chinese Patent Application No. 200980158312.2.

\* cited by examiner

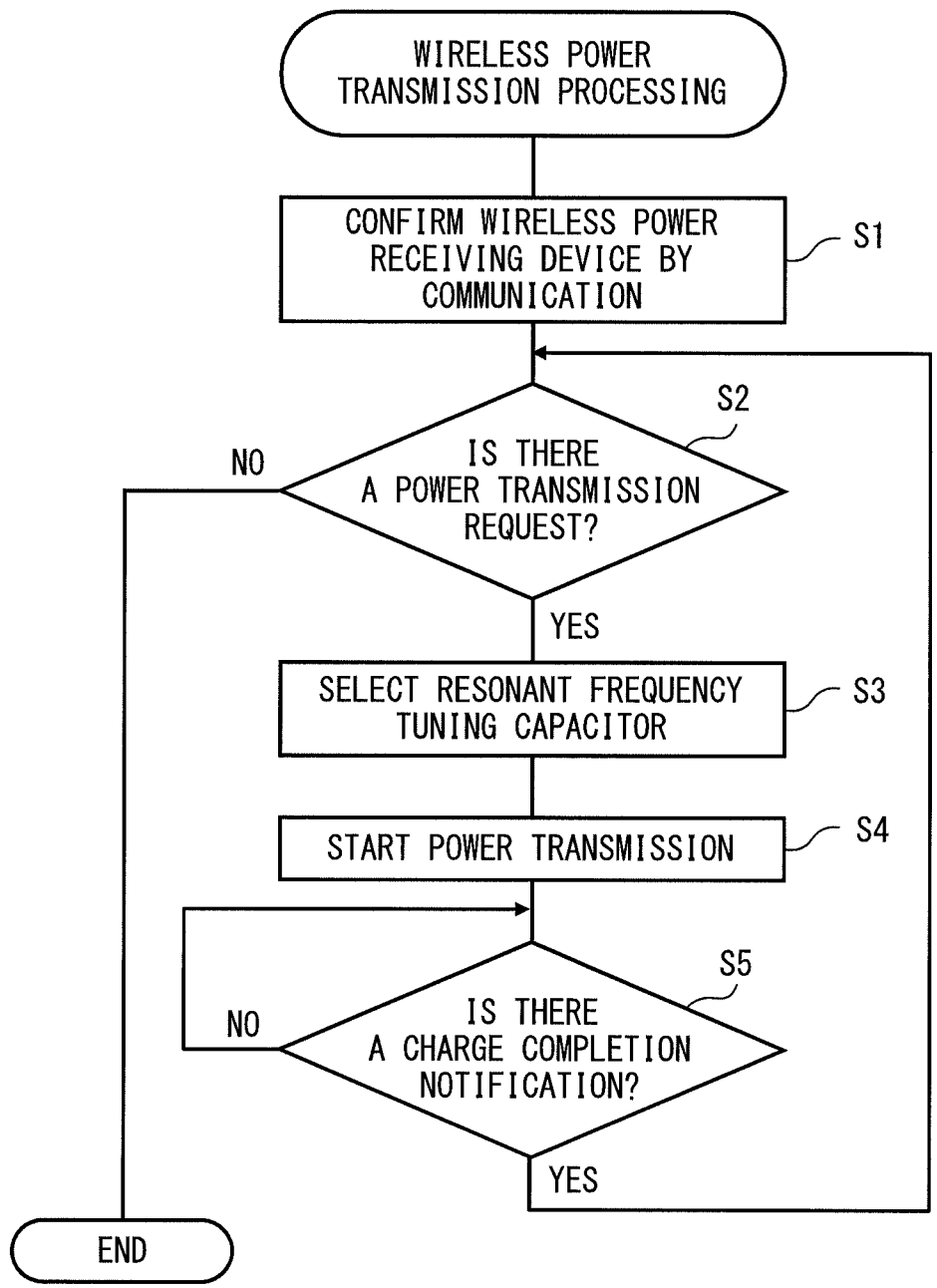
F I G. 2

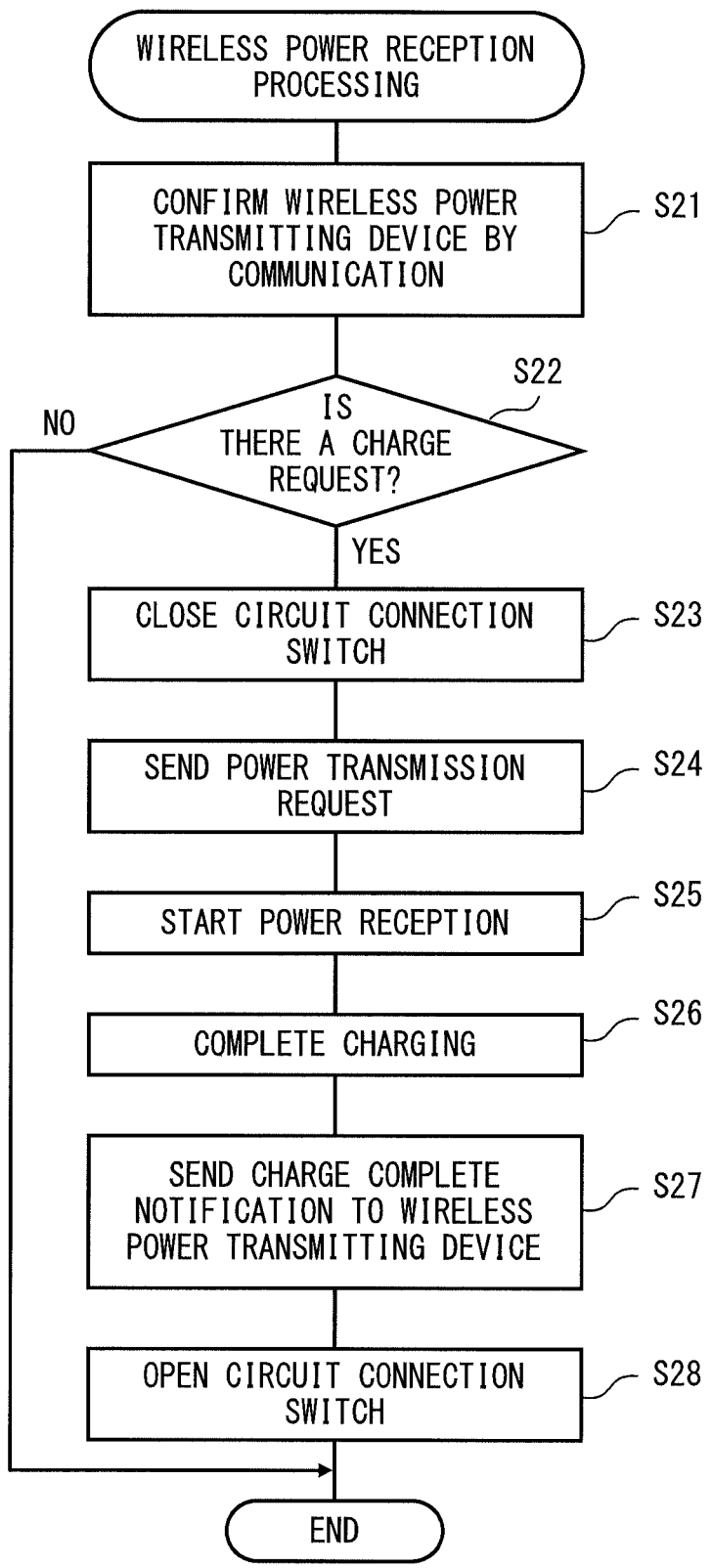
F I G. 5

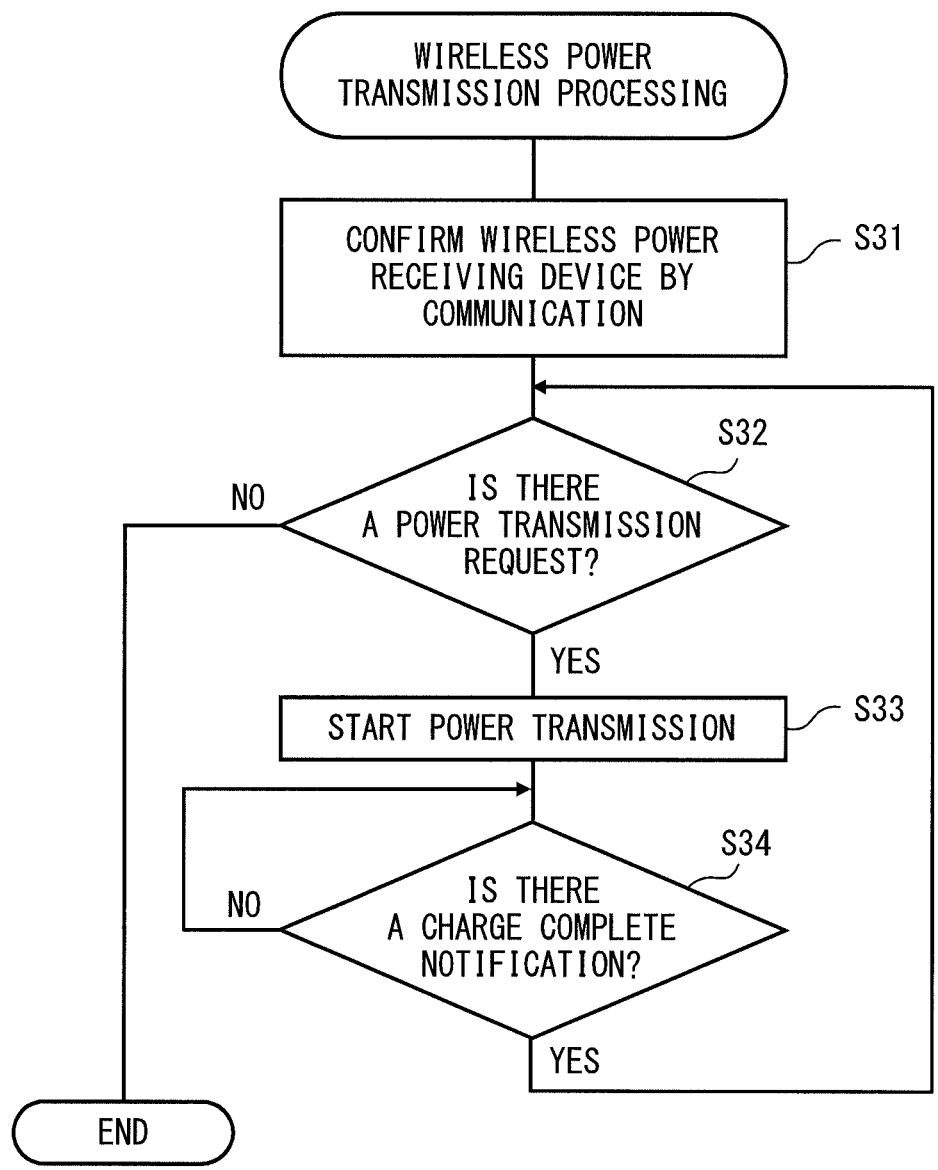
F I G. 6

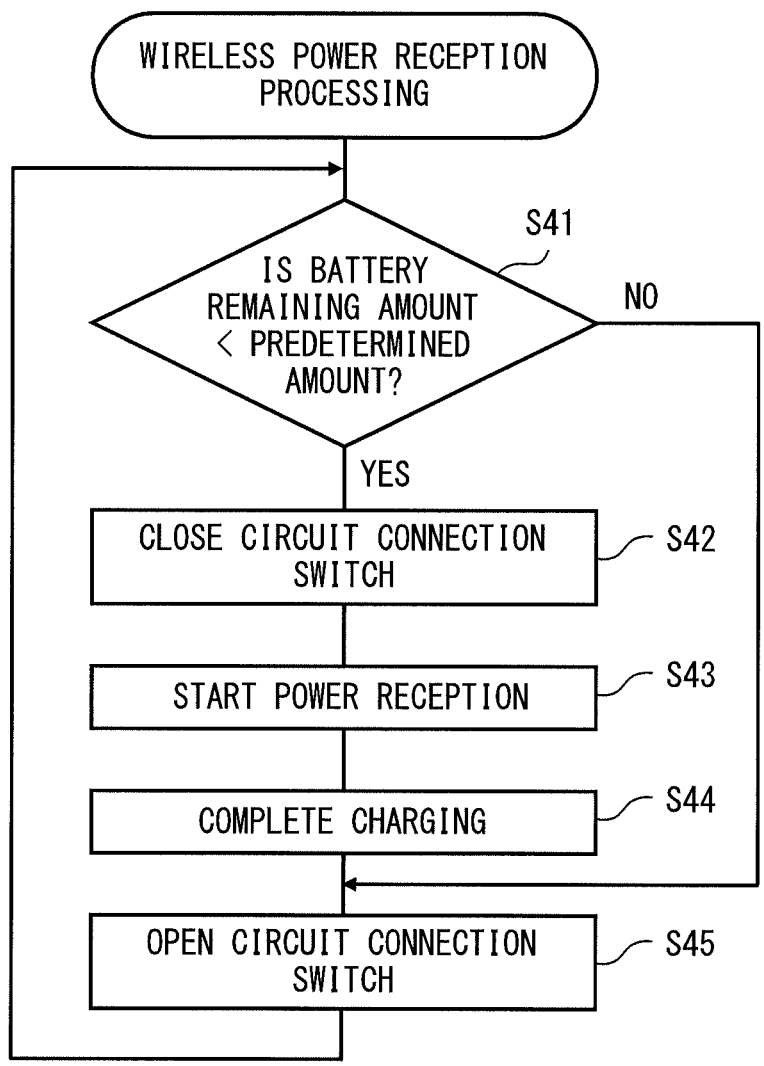
F I G. 8

WIRELESS POWER SUPPLY SYSTEM, WIRELESS POWER TRANSMITTING DEVICE, AND WIRELESS POWER RECEIVING DEVICE

CROSS-REFERENCE TO RELATED APPLICATIONS

This application is a continuation application of International PCT Application No. PCT/JP2009/056459, filed on Mar. 30, 2009, the entire contents of which are incorporated herein by reference.

FIELD

The present invention relates to a wireless power supply system that wirelessly supplies electric power by a so-called magnetic field resonance mode, and a wireless power transmitting device and a wireless power receiving device that are used in this type of wireless power supply system.

BACKGROUND

In recent years, as disclosed in Patent Document 1, technology utilizing a magnetic field resonance mode has been proposed as technology for wirelessly supplying electric power instead of utilizing electromagnetic induction or radio waves. According to such wireless power supply technology that uses a magnetic field resonance mode, for example, a resonator having a resonant angular frequency of $\omega 1$ is provided in a power transmitting device, and a resonator having a resonant angular frequency of $\omega 2$ is provided in a power receiving device. A resonant circuit that connects a coil and a capacitor is applied as a resonator. By tuning the resonant angular frequencies $\omega 1$ and $\omega 2$ and appropriately adjusting the size and arrangement of the resonators, a magnetic field resonance mode is generated in which energy can be transferred between the power transmitting device and the power receiving device, and power is wirelessly transmitted from the resonator of the power transmitting device to the resonator of the power receiving device. According to this wireless power supply technology, the power utilization efficiency (energy transfer efficiency) may be several tens of percent, so that a distance between the devices can be relatively large, and the power receiving device can be separated by several tens of centimeters or more from the power transmitting device.
Patent Document 1: Japanese National Publication of International Patent Application No. 2009-501510

SUMMARY

According to an aspect of the present invention, a wireless power supply system includes: a wireless power transmitting device configured to include a variable resonant circuit having a variable-controllable resonant frequency characteristic, and to transmit electric power wirelessly via the variable resonant circuit; a power transmission control unit configured to variably control the resonant frequency characteristic of the variable resonant circuit; and a plurality of wireless power receiving devices configured to include respective unique resonant circuits having respective unique resonant frequency characteristics which are different to each other, and to wirelessly receive power from the wireless power transmitting device by a magnetic field resonance mode arising as a result of the unique resonant circuit tuning to a resonant frequency of the variable resonant circuit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a flowchart for describing an operation sequence of a wireless power transmitting device depicted in FIG. 1;
FIG. 5 is a flowchart for describing an operation sequence of a wireless power receiving device depicted in FIG. 4;
FIG. 6 is a flowchart for describing an operation sequence of a wireless power transmitting device depicted in FIG. 4;
FIG. 8 is a flowchart for describing an operation sequence of a wireless power receiving device depicted in FIG. 7;

DESCRIPTION OF EMBODIMENTS

Figure 1:
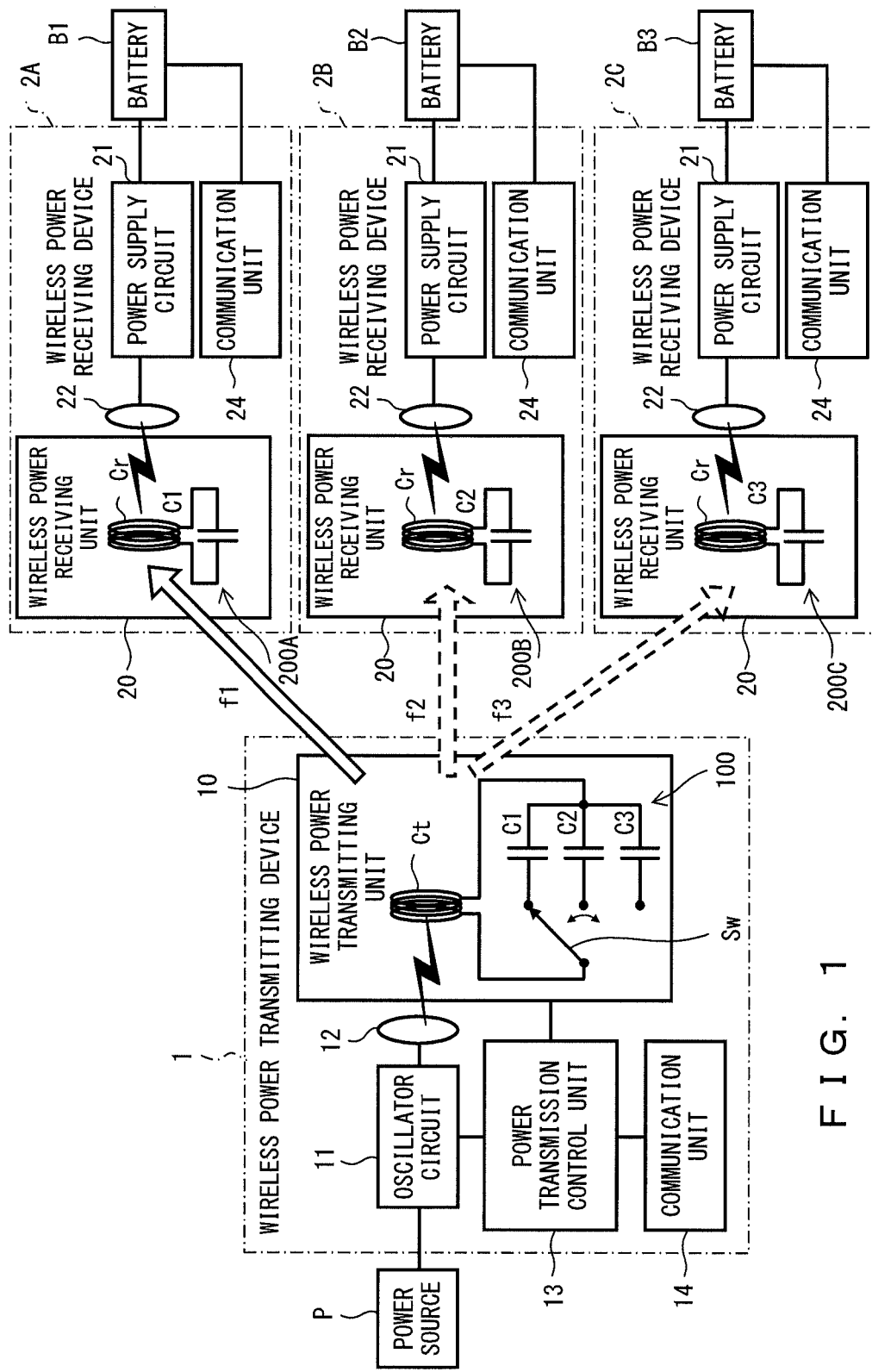
FIG. 1 is a configuration diagram that shows an embodiment of a wireless power supply system to which the present invention is applied.

According to the previous wireless power supply technology that utilizes a magnetic field resonance mode, because the distance between devices for which power transmitting can be performed increases, in some cases a plurality of power receiving devices may be arranged at the periphery of a single power transmitting device. At such time, even if the power transmitting device attempts to supply power simultaneously to the plurality of power receiving devices, differences may arise in the amount of power required by the respective power receiving devices and the amount of power transmitted by the power transmitting device. This situation decreases the overall power transmission efficiency.

For example, even assuming that the plurality of power receiving devices receive power equally, if the power receiving devices include a device that consumes a small quantity of power, such as a wristwatch or an electric calculator, and a device, such as a portable phone, that consumes a large amount of power compared to the device that consumes a small amount of power, efficient power transmitting can not be performed since the amount of power required by the devices is different. That is, because power that should be transmitted to the portable phone is transmitted to the wristwatch or electric calculator, the power transmission efficiency with respect to the portable phone declines.

There is the risk of a similar problem arising when supplying power to a plurality of portable phones. For example, there is a difference between the amount of power required by a device for which charging is completed and which only requires a standby power, and the amount of power required by a device which requires wireless power during a phone call while also being charged at the same time. In this case also, there is a decrease in the power transmission efficiency with respect to the device that is more in need of the electric power.

The power transmission efficiency with respect to a plurality of power receiving devices differs not only according to the characteristics of the respective devices, but also according to the distance between the power transmitting device and each power receiving device as well as the posture of the power transmitting device and each power receiving device. For example, a case may be assumed in which there are two portable phones, one of which is not being operated and requires charging, and the other of which has completed charging and is being used for a phone call and requires wireless power for that purpose. In this case, both devices require approximately the same amount of power. At such time, a difference arises with respect to the power transmission efficiency between the device that is being held by the user during the phone call and the device that is in a stationary state in order to undergo charging at a suitable distance and posture in terms of the power transmission efficiency.

More specifically, according to the above described wireless power supply technology that utilizes a magnetic field resonance mode, when supplying power simultaneously to a plurality of power receiving devices from a single power transmitting device, there is the drawback that an equal energy transfer efficiency can not be obtained at all of the power receiving devices, and the overall power transmission efficiency is poor.

Some embodiments of the present invention have been conceived in light of the above described circumstances, and an object of the present invention is to provide a wireless power supply system that can wirelessly supply power efficiently to a plurality of devices without lowering the energy transfer efficiency. Another object of the present invention is to provide a wireless power transmitting device and a wireless power receiving device that are used in such a wireless power supply system.

To solve the above described problems, the embodiments of the present invention have the technical features as described below.

Preferred embodiments of the present invention will be described in detail hereunder with reference to the drawings.

Figure 3:
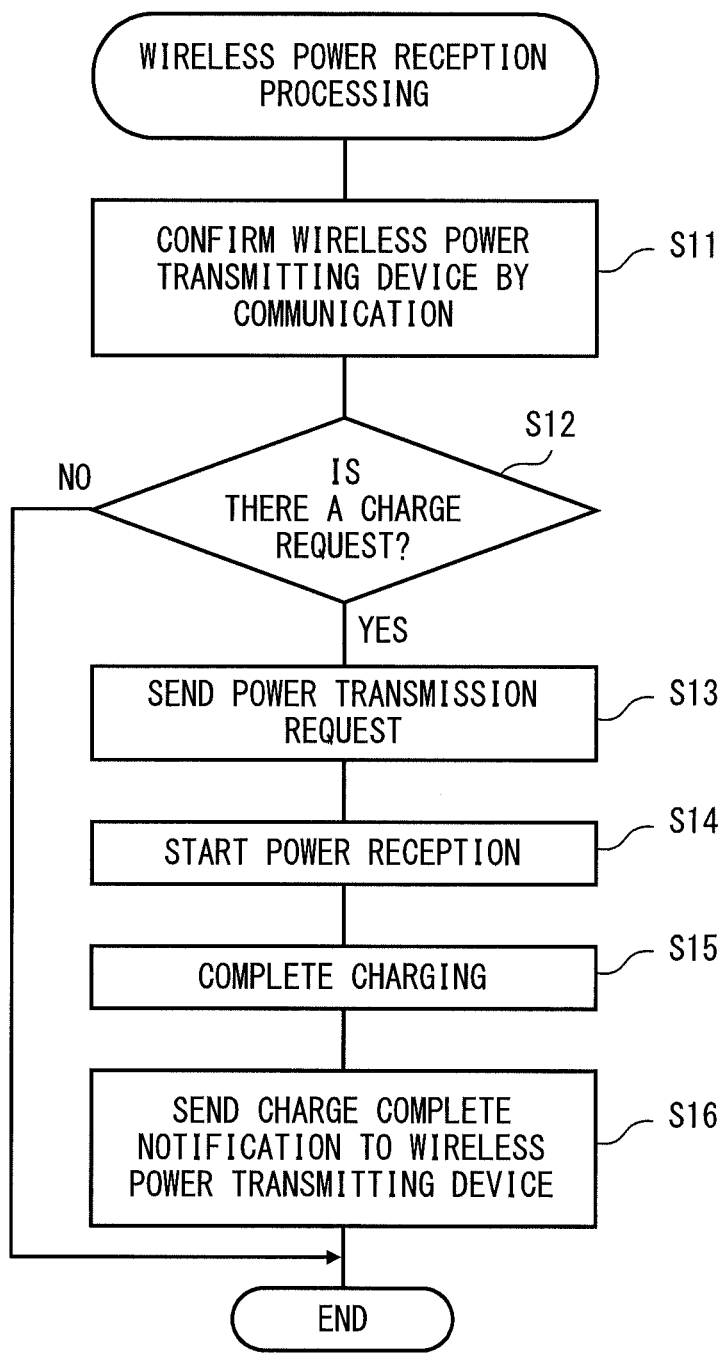
FIG. 3 is a flowchart for describing an operation sequence of a wireless power receiving device depicted in FIG. 1.

FIGS. 1 to 3 illustrate one embodiment of a wireless power supply system to which the present invention is applied. The wireless power supply system of the present embodiment includes a wireless power transmitting device 1 and a plurality of wireless power receiving devices 2A to 2C as basic components. A power source P is connected to the wireless power transmitting device 1. The power source P is, for example, a commercial power source. Batteries B1 to B3 are connected to wireless power receiving devices 2A to 2C, respectively. The batteries B1 to B3 are loaded in an electronic device such as a notebook-size personal computer or a mobile communication terminal, and fulfill a function as a battery when connected to the wireless power receiving devices 2A to 2C, respectively.

The wireless power transmitting device 1 includes a wireless power transmitting unit 10, an oscillator circuit 11, an electromagnetic induction coil 12, a power transmission control unit 13, and a communication unit 14. The power source P is connected to the oscillator circuit 11. The electromagnetic induction coil 12 is connected to the oscillator circuit 11. Electric power is transmitted to the wireless power transmitting unit 10 via the electromagnetic induction coil 12. The power transmission control unit 13 is connected to the wireless power transmitting unit 10, the oscillator circuit 11, and the communication unit 14, and exchanges various signals with each of these components.

The wireless power transmitting unit 10 includes a variable resonant circuit 100 that can variably control a resonant frequency. The variable resonant circuit 100 includes an air-core power transmitting coil Ct, and a plurality of capacitors C1 to C3 that are selectively connected to the power transmitting coil Ct through a circuit connection switch Sw. The variable resonant circuit 100 constitutes a closed circuit when any one of the capacitors C1 to C3 is serially connected to the power transmitting coil Ct via the circuit connection switch Sw. An alternating current power of a predetermined frequency is supplied to the power transmitting coil Ct from the electromagnetic induction coil 12. The capacitors C1 to C3 have mutually different capacitances. Herein, an inductance of the power transmitting coil Ct is denoted by the character L, and the capacitances of the capacitors C1 to C3 are denoted by the same reference characters C1 to C3, respectively. In this case, the variable resonant circuit 100 enters a resonant state when a frequency f of the alternating current power that is input matches any one of frequencies f1 to f3, where $f1=\frac{1}{2}\pi(LC1)^{1/2}$, $f2=\frac{1}{2}\pi(LC2)^{1/2}$, or $f3=\frac{1}{2}\pi(LC3)^{1/2}$. These frequencies f1 to f3 are the resonant frequencies of the variable resonant circuit 100. In the resonant state, energy is cyclically exchanged from an electric field formed by a voltage inside any one of the capacitors C1 to C3 to a free space magnetic field formed by a current flowing through the power transmitting coil Ct. When a coil (a power receiving coil Cr of the wireless power receiving devices 2A to 2C that are described later) that has the same resonant frequency characteristic as the power transmitting coil Ct is brought adjacent to a certain extent to the power transmitting coil Ct which is in a resonant state, the adjacent coil resonates due to the magnetic field from the power transmitting coil Ct. Such a resonant phenomenon caused by the magnetic field is referred to as a magnetic field resonance mode. In the magnetic field resonance mode, the alternating current power flowing through the power transmitting coil Ct is wirelessly transmitted to the adjacent coil.

The oscillator circuit 11 is a variable frequency oscillator circuit such as, for example, a Colpitts oscillator circuit, and causes an alternating current that matches any one of the resonant frequencies f1 to f3 of the variable resonant circuit 100 to flow to the electromagnetic induction coil 12.

The electromagnetic induction coil 12 transmits alternating current power that matches any one of the resonant frequencies f1 to f3 to the power transmitting coil Ct of the variable resonant circuit 100 by electromagnetic induction. A distance (for example, approximately 1 centimeter) by which the electromagnetic induction coil 12 and the power transmitting coil Ct are separated is comparatively small compared to a distance (for example, several tens of centimeters) from the power transmitting coil Ct to the power receiving coils Cr of the wireless power receiving devices 2A to 2C. By electrically separating the variable resonant circuit 100 and the electromagnetic induction coil 12 in this way, a Q value of the variable resonant circuit 100 can be increased. The Q is an index which represents sharpness of the resonance, and is determined by a pure resistance and a radiation resistance of the coil, and the smaller that the resistance values are, the larger the Q value that can be obtained. Since the electromagnetic induction coil 12 utilizes electromagnetic induction and does not use magnetic field resonance, the resonant frequency need not be considered with respect to the electromagnetic induction coil 12. Accordingly, with respect to the electromagnetic induction coil 12, it is not necessary to take into account the resonant frequency changes depending on the oscillator circuit 11 that is connected thereto. Thus, by using the electromagnetic induction coil 12, it is possible to increase the degree of design flexibility of the oscillator circuit 11. In this connection, a power transmitting coil may be configured to supply alternating current power using a wire, without using an electromagnetic induction coil.

The power transmission control unit 13 actuates the circuit connection switch Sw of the variable resonant circuit 100 in accordance with a command from the communication unit 14 to variably control the resonant frequencies f1 to f3 of the variable resonant circuit 100. For example, when the capacitor C1 is connected through the circuit connection switch Sw, the resonant frequency of the variable resonant circuit 100 becomes f1, when the capacitor C2 is connected, the resonant frequency becomes f2, and when the capacitor C3 is connected, the resonant frequency becomes f3. When variably controlling the resonant frequencies f1 to f3 in this way, the power transmission control unit 13 also performs variable control with respect to an alternating current frequency generated at the oscillator circuit 11 so as to match the alternating current frequency with any one of the resonant frequencies f1 to f3. Therefore, a resonant state of the power transmitting coil Ct is changed in accordance with the different resonant frequencies f1 to f3.

The communication unit 14 wirelessly exchanges various types of information with respective communication units 24 of the wireless power receiving devices 2A to 2C that are described below.

Each of the wireless power receiving devices 2A to 2C includes a wireless power receiving unit 20, a power supply circuit 21, an electromagnetic induction coil 22, and a communication unit 24. The batteries B1 to B3 are connected to the respective power supply circuits 21 and the respective communication units 24. The electromagnetic induction coil 22 is connected to the power supply circuit 21. Power that is received by the wireless power receiving unit 20 is transmitted through the electromagnetic induction coil 22 to the power supply circuit 21. Similarly to the variable resonant circuit 100 of the wireless power transmitting unit 10, the wireless power receiving unit 20 is not serially connected to the power supply circuit 21 in order to increase the Q value. The wireless power receiving unit 20 includes an LC resonant circuit. The electric power is taken out from the wireless power receiving unit 20 by electromagnetic induction from the electromagnetic induction coil 22. The wireless power receiving unit 20 and the electromagnetic induction coil 22 are arranged at a distance that is short enough to allow the electric power to be taken out by electromagnetic induction.

The wireless power receiving units 20 respectively include unique resonant circuits 200A to 200C that each has a unique resonant frequency characteristic for each of the wireless power receiving devices 2A to 2C. Each of the unique resonant circuits 200A to 200C includes an air-core power receiving coil Cr, as well as respective capacitors C1 to C3. The capacitors C1 to C3 are connected to the corresponding power receiving coils Cr. Each power receiving coil Cr, for example, has the same electrical characteristics as the power transmitting coil Ct. According to the present embodiment, the inductance of the power receiving coil Cr is the same value L as the power transmitting coil Ct. The respective capacitors C1 to C3 of the unique resonant circuits 200A to 200C have mutually different capacitances. According to the present embodiment, the capacitors C1 to C3 also have the same electrical characteristics as the capacitors C1 to C3 of the wireless power transmitting device 1, and the respective capacitances C1 to C3 thereof are denoted by the same reference characters. More specifically, the unique resonant circuits 200A to 200C have the same resonant frequencies f1 to f3 as the frequencies generated in the variable resonant circuit 100 for each of the wireless power receiving devices 2A to 2C.

In this connection, the term "same resonant frequency" as used herein does not mean the exact same frequency. Even if resonant frequencies of a plurality of resonant circuits match in a simulation or the like, the resonant frequencies of a plurality of resonant circuits do not match in reality. Accordingly, the term "same resonant frequency" refers to frequency that is substantially the same. A range in which the frequency is substantially the same is determined, for example, according to the Q value. The range in which the frequency is substantially the same narrows as the Q value increases, and the range widens as the Q value decreases. As a guideline, the range in which the frequency is substantially the same is a frequency range (half-width) in which the value at the resonance point becomes half-value. Alternatively, the range in which the frequency is substantially the same is a frequency range in which a target efficiency is achieved. Expressed in a different way, the range in which the frequency is substantially the same is a frequency range (range in which a so-called "magnetic field resonance mode" arises) in which, in a positional relationship in which coils are separated, electric power can be transmitted with an efficiency that is higher than when transmitted by electromagnetic induction. In this connection, the aforementioned range of the same frequency is a matter that is determined based on common knowledge of those skilled in the art, without providing a description thereof herein. However, sometimes a technician that does not have the common knowledge of those skilled in the art may refer to this description. The above description is provided in consideration of such a case, and the description is not intended to limit the scope of the present invention.

For example, when the power transmitting coil Ct of the wireless power transmitting device 1 is in a resonant state that has a resonant frequency f1, if the power receiving coil Cr of the wireless power receiving device 2A is brought near to the power transmitting coil Ct so that there is a distance of, for example, approximately several tens of centimeters therebetween, a magnetic field resonance mode arises as the result of tuning of the resonant frequency f1. In this state in which the magnetic field resonance mode has arisen, electric power from the power transmitting coil Ct is wirelessly transmitted to the power receiving coil Cr, and the electric power is received by the power receiving coil Cr. The electric power received by the power receiving coil Cr is taken into the power supply circuit 21 via the electromagnetic induction coil 22. At this time, since a magnetic field resonance mode does not arise between the other wireless power receiving devices 2B and 2C that are not tuned to the resonant frequency f1 and the wireless power transmitting device 1, electric power from the wireless power transmitting device 1 is not transmitted to the other wireless power receiving devices 2B and 2C. Similarly, when the resonant frequency of the wireless power transmitting device 1 is switched to f2 or f3 and tuned to the corresponding resonant frequency f2 or f3 of the wireless power receiving device 2B or 2C, a magnetic field resonance mode only arises between the wireless power transmitting device 1 and the relevant wireless power receiving device 2B or 2C which is tuned to the resonant frequency f2 or f3. Therefore, a relatively strong magnetic field resonance mode arises only at the device among the wireless power receiving devices 2A to 2C that is tuned to the relevant frequency among the resonant frequencies f1 to f3, and electric power is efficiently transmitted wirelessly in a selective manner to the relevant device requiring the electric power supply among the wireless power receiving device 2A to 2C.

Each power supply circuit 21 generates an output power required by the corresponding batteries B1 to B3 from the electric power that is taken via the electromagnetic induction coils 22.

Each electromagnetic induction coil 22 transmits electric power from the power receiving coil Cr to the power supply circuit 21 by electromagnetic induction. A distance between the electromagnetic induction coil 22 and the power receiving coil Cr is considerably smaller than the distance from the power receiving coil Cr to the power transmitting coil Ct. For example, the distance between the electromagnetic induction coil 22 and the power receiving coil Cr is approximately one centimeter. In this connection, a configuration may be adopted in which an electromagnetic induction coil is not used and the power supply circuit and the power receiving coil are connected to each other by a wire, so that the electric power from the power receiving coil is directly taken into the power supply circuit.

Each communication unit 24 exchanges various types of information with the communication unit 14 of the wireless power transmitting device 1. For example, when a state of charge of the corresponding battery among the batteries B1 to B3 becomes less than a predetermined reference level, a charge request is transmitted to the communication unit 24 from the control circuit (not depicted) of the corresponding battery among the batteries B1 to B3. In response to the charge request, the communication unit 24 sends a power transmission request to the communication unit 14 of the wireless power transmitting device 1. At this time, the communication unit 24 also sends information relating to the corresponding resonant frequency among the resonant frequencies f1 to f3 that is required for power transmission, together with the power transmission request. The communication unit 14 of the wireless power transmitting device 1 that receives the information relating to the corresponding resonant frequency f1, f2 or f3 from the communication unit 24 of the device requesting power transmission communicates the information relating to the resonant frequency f1, f2 or f3 of the device requesting power transmission to the power transmission control unit 13. As a result, the variable resonant circuit 100 of the wireless power transmitting device 1 is tuned to the corresponding resonant frequency f1, f2 or f3 of the device requesting power transmission.

The wireless power transmitting device 1 and the wireless power receiving devices 2A to 2C execute wireless power transmission processing and wireless power reception processing according to the operation sequences depicted in FIG. 2 and FIG. 3.

First, as depicted in FIG. 2, the communication unit 14 of the wireless power transmitting device 1 confirms that the wireless power receiving devices 2A to 2C are counterparts with which communication can be performed (S1).

Next, the communication unit 14 monitors whether or not there is a power transmission request from the wireless power receiving devices 2A to 2C with which communication can be performed (S2).

For example, if a power transmission request is received from a single wireless power receiving device 2A (S2: Yes), the communication unit 14 notifies the power transmission control unit 13 of that effect, and also notifies the power transmission control unit 13 of the resonant frequency f1 of the wireless power receiving device 2A. As a result, the power transmission control unit 13 tunes the alternating current frequency of the oscillator circuit 11 to the resonant frequency f1, selects the capacitor C1 that corresponds to the resonant frequency f1, and connects the circuit connection switch Sw thereto (S3). Thus, the power transmitting coil Ct of the wireless power transmitting unit 10 enters a resonant state in which the resonant frequency is f1 and thereby starts to transmit power (S4). In this connection, when there is a power transmission request from a plurality of wireless power receiving devices, and the power transmission requests are received in an overlapping manner, for example, the power transmission control unit 13 may tune the alternating current frequency of the oscillator circuit 11 to the resonant frequencies of the corresponding wireless power receiving devices in the order in which the power transmission requests are received, or may match the frequency of the oscillator circuit 11 to the required resonant frequencies in a cyclical manner by means of time sharing processing.

After power transmission begins, the communication unit 14 monitors whether or not a charge complete notification is received from the wireless power receiving device 2A that is the counterpart (S5).

When a charge complete notification is received from the wireless power receiving device 2A (S5: Yes), the communication unit 14 returns to S2 and again monitors whether or not there is a power transmission request.

In S5, if a charge complete notification is not received from the wireless power receiving device 2A (S5: No), since the transmission of power to the wireless power receiving device 2A is still in progress, the communication unit 14 continues monitoring until the charge complete notification is received from the wireless power receiving device 2A.

In S2, when there is no power transmission request from any of the wireless power receiving devices 2A to 2C (S2: No), after stopping operation of the oscillator circuit 11, the wireless power transmitting device 1 ends the series of operations relating to the wireless power transmission processing. After the wireless power transmission processing operations end, the wireless power transmitting device 1 returns to S1 to repeat execution of the series of operations. In this connection, when a power transmission request is received from either of the other wireless power receiving devices 2B and 2C, the series of operations relating to wireless power transmission processing is executed in a similar manner.

Further, as depicted in FIG. 3, for example, at the single wireless power receiving device 2A, the communication unit 24 confirms that the wireless power transmitting device 1 is a counterpart with which communication can be performed (S11).

When the wireless power transmitting device 1 has been confirmed as a counterpart, the communication unit 24 monitors whether or not there is a charge request from the battery B1 (S12).

If a charge request is received from the battery B1 (S12: Yes), the communication unit 24 sends a power transmission request to the wireless power transmitting device 1 and also transmits information relating to the resonant frequency f1 to the wireless power transmitting device 1 (S13). As a result, preparations for starting power transmission are carried out at the wireless power transmitting device 1 (S3 in FIG. 2), and power transmission is started after the preparations are completed (S4 in FIG. 2). More specifically, a magnetic field resonance mode arises as the result of tuning of the resonant frequency f1 between the wireless power receiving device 2A that sent the power transmission request and the wireless power transmitting device 1, and the wireless power receiving device 2A starts power reception so that electric power is wirelessly transmitted from the power transmitting coil Ct to the power receiving coil Cr (S14). The electric power that is transmitted to the wireless power receiving device 2A is supplied to the battery B1 via the power receiving coil Cr, the electromagnetic induction coil 22 and the power supply circuit 21 to thereby charge the battery B1. At this time, since a magnetic field resonance mode does not arise between the wireless power receiving devices 2B and 2C that are not tuned to the resonant frequency f1 and the wireless power transmitting device 1, electric power is not transmitted unnecessarily.

When charging of the battery B1 is completed after a predetermined time period elapses following the start of power reception (S15), the communication unit 24 notifies the wireless power transmitting device 1 that charging is completed (S16). Thereby, the wireless power receiving device 2A ends the series of operations relating to wireless power reception processing. After the end of the wireless power reception processing operations, the wireless power receiving device 2A returns to S11 and execution of the series of operations is repeated.

In S12, if a charge request is not received from the battery B1 (S12: No), the wireless power receiving device 2A ends the operations relating to wireless power reception processing. In this connection, a series of operations relating to wireless power reception processing is executed in the same manner at the other wireless power receiving devices 2B and 2C also.

Therefore, according to the wireless power supply system of the present embodiment, the resonant frequencies f1 to f3 can be selectively tuned for the wireless power receiving devices 2A to 2C that send a power transmission request, and a comparatively strong magnetic field resonance mode can be generated. Therefore, since the energy transfer efficiency to only a wireless power receiving device that requires power transmission among the wireless power receiving devices 2A to 2C is improved and wasteful electric power loss that accompanies wireless power supply is suppressed as much as possible, the power can be efficiently supplied wirelessly by an on-demand system.

FIGS. 4 to 8 illustrate another embodiment of a wireless power supply system to which the present invention is applied. Components that are identical or similar to components in the foregoing embodiment are denoted by the same reference characters, and a description of such components is omitted.

Figure 4:
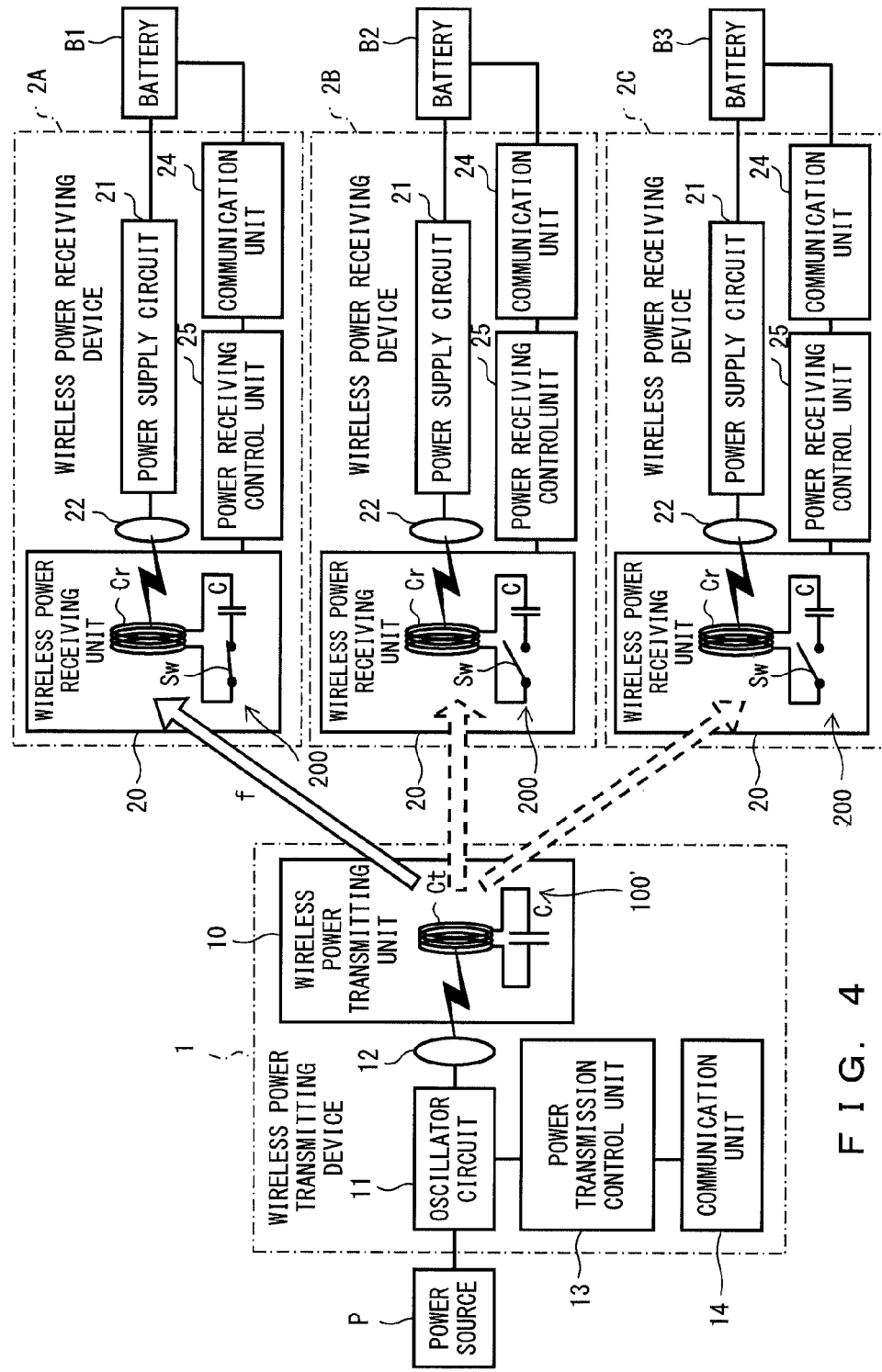
FIG. 4 is a configuration diagram that shows another embodiment of a wireless power supply system to which the present invention is applied.

In a wireless power supply system depicted in FIG. 4, the wireless power transmitting device 1 includes the wireless power transmitting unit 10, the oscillator circuit 11, the electromagnetic induction coil 12, the power transmission control unit 13, and the communication unit 14. The wireless power transmitting unit 10 includes a power transmitting resonant circuit 100' that has a predetermined resonant frequency f. The power transmitting resonant circuit 100' is a closed circuit in which the power transmitting coil Ct and the capacitor C are serially connected. The power transmitting coil Ct has an inductance L, and the capacitor C has a capacitance that is denoted by the same reference symbol C. In this case, the power transmitting resonant circuit 100' enters a resonant state when the frequency of alternating current power that is input matches a frequency f, where $f = 1/2\pi(LC)^{1/2}$. More specifically, the resonant frequency of the power transmitting resonant circuit 100' is f.

The oscillator circuit 11 causes an alternating current that matches the resonant frequency f of the power transmitting resonant circuit 100' to flow to the electromagnetic induction coil 12.

The electromagnetic induction coil 12 wirelessly transmits the alternating current power that matches the resonant frequency f to the power transmitting coil Ct of the power transmitting resonant circuit 100' by electromagnetic induction.

The power transmission control unit 13 controls so as to cause an alternating current frequency that is generated by the oscillator circuit 11 to match the resonant frequency f in accordance with a command from the communication unit 14.

The wireless power receiving devices 2A to 2C have the same components and electrical characteristics as each other, and each of them includes the wireless power receiving unit 20, the power supply circuit 21, the electromagnetic induction coil 22, the communication unit 24, and a power receiving control unit 25. The power receiving control unit 25 is connected to the wireless power receiving unit 20 and the communication unit 24.

The wireless power receiving unit 20 includes a power receiving resonant circuit 200 that has the same resonant frequency characteristics as the power transmitting resonant circuit 100' of the wireless power transmitting device 1. More specifically, the power receiving resonant circuit 200 includes the power receiving coil Cr that has the same electrical characteristics as the power transmitting coil Ct, and the capacitor C that is connected to the power receiving coil Cr via a circuit connection switch Sw. The capacitor C has the same electrical characteristics as the capacitor C of the power transmitting resonant circuit 100'. The power receiving coil Cr has an inductance L, and the capacitor C has a capacitance that is denoted by the same reference symbol C. The power receiving resonant circuit 200 becomes a closed circuit when the capacitor C and the power receiving coil Cr are serially connected via the circuit connection switch Sw.

For example, when the power transmitting coil Ct of the wireless power transmitting device 1 is in a resonant state having a resonant frequency f, and the power receiving resonant circuit 200 of the wireless power receiving device 2A has been made a closed circuit, if the power receiving coil Cr is brought near to the power transmitting coil Ct, a magnetic field resonance mode arises as the result of tuning of the resonant frequency f. As a result, electric power from the power transmitting coil Ct is wirelessly transmitted to the power receiving coil Cr, and the electric power is received by the power receiving coil Cr. The electric power received by the power receiving coil Cr is taken into the power supply circuit 21 via the electromagnetic induction coil 22. At this time, a magnetic field resonance mode does not arise between the wireless power transmitting device 1 and the other wireless power receiving devices 2B and 2C in each of which the circuit connection switch Sw is in an open state and the power receiving resonant circuit 200 is not a closed circuit. More specifically, electric power from the wireless power transmitting device 1 is not transmitted to the wireless power receiving devices 2B and 2C in each of which the circuit connection switch Sw is in an open state. If the circuit connection switch Sw is placed in a closed state in each of the wireless power receiving devices 2B and 2C also, because the resonant frequency f is tuned, a magnetic field resonance mode will arise between the wireless power receiving devices 2B and 2C and the wireless power transmitting device 1. Consequently, for example, when the circuit connection switch Sw is in a closed state in all of the plurality of wireless power receiving devices 2A, 2B and 2C, a magnetic field resonance mode arises between the wireless power transmitting device 1 and all of the wireless power receiving devices 2A, 2B and 2C, and electric power is wirelessly transmitted simultaneously.

Each communication unit 24 transmits a power transmission request to the communication unit 14 of the wireless power transmitting device 1, and also sends to the power receiving control unit 25 a charge request or a charge complete notification from the corresponding battery B1, B2, or B3.

Upon receiving a charge request from the communication unit 24, the power receiving control unit 25 places the circuit connection switch Sw of the power receiving resonant circuit 200 in a closed state. As a result, the power receiving resonant circuit 200 becomes a closed circuit and is tuned to the resonant frequency f of the power transmitting resonant circuit 100'. In contrast, when a notification that charging is completed is received from the communication unit 24, the power receiving control unit 25 places the circuit connection switch Sw of the power receiving resonant circuit 200 in an open state. As a result, the power receiving resonant circuit 200 is released from the resonant state.

The wireless power receiving devices 2A to 2C and the wireless power transmitting device 1 depicted in FIG. 4 execute wireless power reception processing and wireless power transmission processing according to the operation sequences depicted in FIG. 5 and FIG. 6.

First, as depicted in FIG. 5, for example, at the single wireless power receiving device 2A, the communication unit 24 confirms the wireless power transmitting device 1 (S21).

When the wireless power transmitting device 1 has been confirmed, the communication unit 24 monitors whether or not there is a charge request from the battery B1 (S22).

If a charge request is received from the battery B1 (S22: Yes), the communication unit 24 notifies the power receiving control unit 25 of that effect. As a result, the power receiving control unit 25 places the circuit connection switch Sw in a closed state (S23).

Thereafter, the communication unit 24 transmits a power transmission request to the wireless power transmitting device 1 (S24). As a result, the wireless power transmitting device 1 starts to transmit power. More specifically, a magnetic field resonance mode arises as the result of tuning of the resonant frequency f between the wireless power receiving device 2A that sent the power transmission request and the wireless power transmitting device 1, and the wireless power receiving device 2A starts power reception so that electric power is wirelessly transmitted from the power transmitting coil Ct to the power receiving coil Cr (S25). The electric power that is transmitted to the wireless power receiving device 2A is supplied to the battery B1 via the power receiving coil Cr, the electromagnetic induction coil 22, and the power supply circuit 21 to thereby charge the battery B1. At this time, a magnetic field resonance mode does not arise between, for example, the wireless power receiving devices 2B and 2C in each of which the circuit connection switch Sw is in an open state and the wireless power transmitting device 1, and therefore electric power is not transmitted unnecessarily. If the circuit connection switch Sw in each of the wireless power receiving devices 2B and 2C is in a closed state, electric power is also transmitted simultaneously to the wireless power receiving devices 2B and 2C.

When charging of the battery B1 is completed after a predetermined time period elapses following the start of power reception (S26), the communication unit 24 notifies the wireless power transmitting device 1 that charging is completed (S27). At this time, the communication unit 24 also notifies the power receiving control unit 25 that charging is completed.

Thereafter, the power receiving control unit 25 places the circuit connection switch Sw in an open state (S28). Thus, the wireless power receiving device 2A ends the series of operations relating to wireless power reception processing. After the wireless power reception processing operations end, the wireless power receiving device 2A returns to S21 to repeat execution of the series of operations.

In S22, if a charge request is not received from the battery B1 (S22: No), the wireless power receiving device 2A ends the operations relating to wireless power reception processing. In this connection, a series of operations relating to wireless power reception processing is executed in the same manner at the other wireless power receiving devices 2B and 2C also.

Further, as depicted in FIG. 6, the communication unit 14 of the wireless power transmitting device 1 first confirms that the wireless power receiving devices 2A to 2C are counterparts with which communication can be performed (S31).

Next, the communication unit 14 monitors whether or not there is a power transmission request from the wireless power receiving devices 2A to 2C with which communication can be performed (S32).

For example, if a power transmission request is received from the wireless power receiving device 2A (S32: Yes), the communication unit 14 notifies the power transmission control unit 13 of that effect. As a result, the power transmission control unit 13 places the oscillator circuit 11 in an operating state and tunes the alternating current frequency to the resonant frequency f. Thus, the power transmitting coil Ct of the wireless power transmitting unit 10 enters a resonant state and starts power transmission (S33). In this connection, operations are performed in a similar manner in a case in which there are power transmission requests from a plurality of wireless power receiving devices, and in which the power transmission requests are received in an overlapping manner. Accordingly, the wireless power transmitting device can supply electric power simultaneously to all wireless power receiving devices from which a power transmission request is sent.

After power transmission starts, the communication unit 14 monitors whether or not a charge complete notification is received from the wireless power receiving device 2A that is the counterpart (S34).

If a charge complete notification is received from the wireless power receiving device 2A (S34: Yes), the communication unit 14 returns to S32 and again monitors whether or not there is a power transmission request.

In S34, if a charge complete notification is not received from the wireless power receiving device 2A (S34: No), since the transmission of power to the wireless power receiving device 2A is still in progress, the communication unit 14 continues monitoring until a charge complete notification is received from the wireless power receiving device 2A.

In S32, when there is no power transmission request from any of the wireless power receiving devices 2A to 2C (S32: No), after stopping operation of the oscillator circuit 11, the wireless power transmitting device 1 ends the series of operations relating to wireless power transmission processing. After the wireless power transmission processing operations end, the wireless power transmitting device 1 returns to S31 to repeat execution of the series of operations. In this connection, when a power transmission request is received from either of the other wireless power receiving devices 2B and 2C, the series of operations relating to wireless power transmission processing is executed in a similar manner.

Therefore, according to the wireless power supply system depicted in FIG. 4, the difference between the configuration of the power transmitting resonant circuit 100' and the configuration of the power receiving resonant circuit 200 is only the existence or non-existence of the circuit connection switch Sw, and consequently the resonant circuits 100' and 200 can be configured as comparatively simple circuits that are substantially the same. According to this wireless power supply system also, electric power can be efficiently supplied wirelessly by an on-demand system.

In this connection, as a modification example of the wireless power supply system depicted in FIG. 4, a configuration may be adopted in which, even in a case in which power transmission requests are received at the same time from a plurality of wireless power receiving devices, the circuit connection switch of only one of the plurality of wireless power receiving devices is placed in a closed state, so that electric power is always supplied to only one wireless power receiving device. In such a case, the wireless power transmitting device can supply electric power more efficiently to a required wireless power receiving device.

Figure 7:
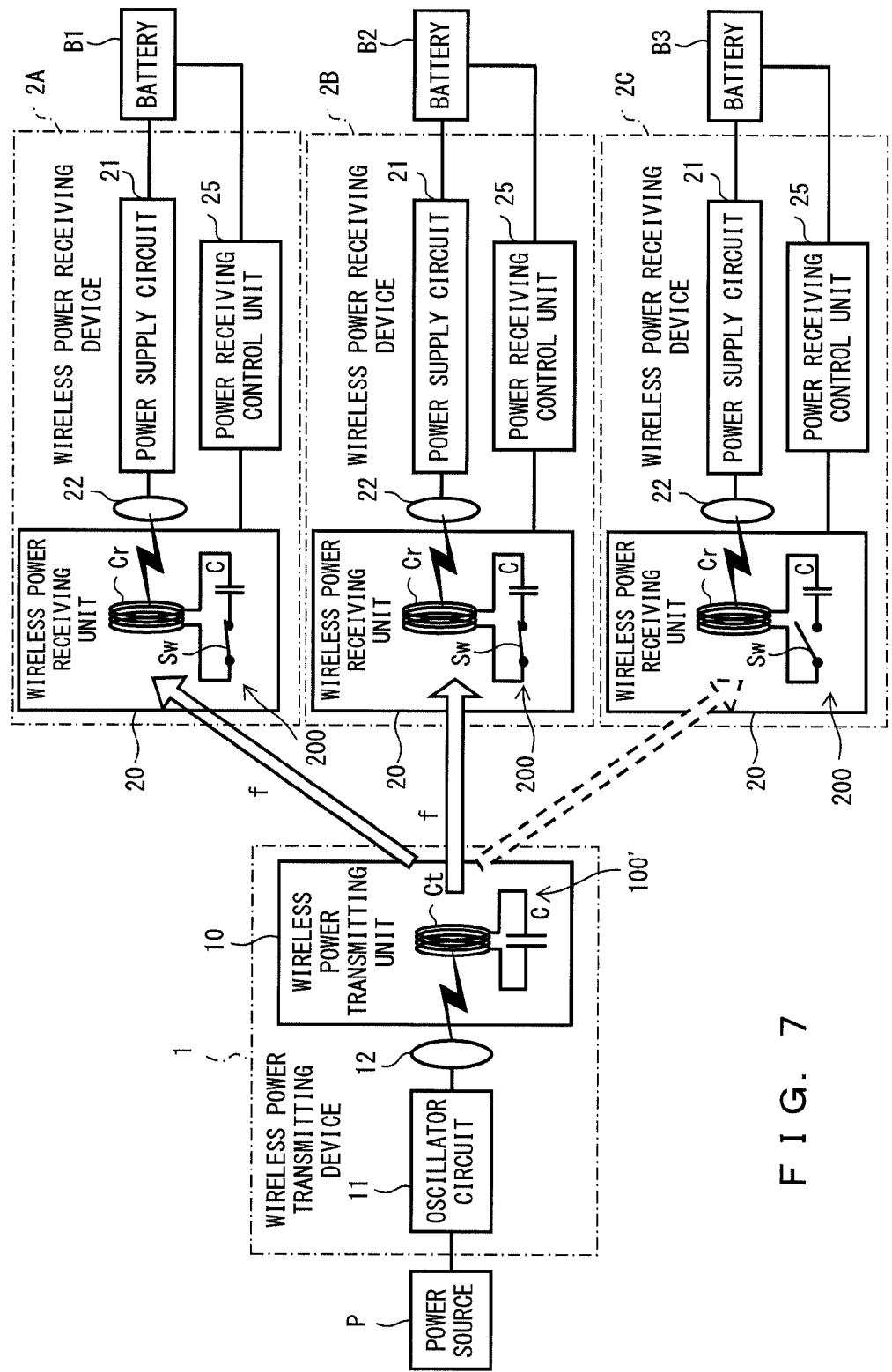
FIG. 7 is a configuration diagram that shows another embodiment of a wireless power supply system to which the present invention is applied.

A wireless power supply system depicted in FIG. 7 is a system that, relative to the wireless power supply system depicted in FIG. 4, does not include a power transmission control unit and a communication unit. More specifically, the wireless power transmitting device 1 includes the wireless power transmitting unit 10, the oscillator circuit 11, and the electromagnetic induction coil 12. Further, the power transmitting resonant circuit 100' of the wireless power transmitting unit 10 is constantly in a resonant state that has a resonant frequency f. Thus, the wireless power transmitting device 1 is in a state in which electric power can be constantly supplied irrespective of whether or not the wireless power receiving devices 2A to 2C with which a magnetic field resonance mode can arise are present in the vicinity of the wireless power transmitting device 1.

The wireless power receiving devices 2A to 2C have the same components and electrical characteristics as each other, and each include the wireless power receiving unit 20, the power supply circuit 21, the electromagnetic induction coil 22, and the power receiving control unit 25. The power receiving control unit 25 is connected to the wireless power receiving unit 20 and the corresponding battery among the batteries B1 to B3. When the remaining amount of the battery becomes less than a predetermined amount, the power receiving control unit 25 places the circuit connection switch Sw of the power receiving resonant circuit 200 in a closed state. As a result, the power receiving resonant circuit 200 becomes a closed circuit and is tuned to the same resonant frequency f as the power transmitting resonant circuit 100'. When charging of the relevant battery B1, B2, or B3 is completed, the power receiving control unit 25 places the circuit connection switch Sw of the power receiving resonant circuit 200 in an open state. As a result, the power receiving resonant circuit 200 is released from the resonant state.

The wireless power receiving devices 2A to 2C depicted in FIG. 7 execute wireless power reception processing according to the operation sequence depicted in FIG. 8.

First, as depicted in FIG. 8, for example, in a single wireless power receiving device 2A, the power receiving control unit 25 monitors the remaining amount of the battery B1 (S41).

When the remaining amount of the battery B1 becomes less than a predetermined amount (S41: Yes), the power receiving control unit 25 places the circuit connection switch Sw in a closed state (S42).

At this time, in the wireless power transmitting device 1, the power transmitting coil Ct is in a resonant state, and thus the wireless power transmitting device 1 is in a state in which electric power can be supplied at all times. Therefore, immediately after the circuit connection switch Sw is placed in a closed state, at the wireless power receiving device 2A, the power receiving coil Cr enters a resonant state by tuning to the resonant frequency f of the power transmitting coil Ct, and starts power reception by means of a magnetic field resonance mode (S43). As a result, electric power from the power transmitting coil Ct is wirelessly transmitted to the power receiving coil Cr. The electric power transmitted to the wireless power receiving device 2A is supplied to the battery B1 via the power receiving coil Cr, the electromagnetic induction coil 22, and the power supply circuit 21 to thereby charge the battery B1. At this time, for example, a magnetic field resonance mode also arises in a similar manner at the wireless power receiving device 2B in which the circuit connection switch Sw is in a closed state as depicted in FIG. 7, and electric power is simultaneously transmitted thereto. In contrast, the wireless power receiving device 2C in which the circuit connection switch Sw is in an open state does not enter a resonant state because the power receiving resonant circuit 200 is not a closed circuit, and therefore electric power from the wireless power transmitting device 1 is not transmitted thereto.

When charging of the battery B1 is completed after a predetermined time period elapses following the starts of power reception (S44), the power receiving control unit 25 places the circuit connection switch Sw in an open state (S45). Thereby, the wireless power receiving device 2A ends the series of operations relating to wireless power reception processing. After the end of the wireless power reception processing operations, the wireless power receiving device 2A returns to S41 and execution of the series of operations is repeated.

In S41, if the remaining amount of the battery B1 is equal to or greater than a predetermined amount (S41: No), the power receiving control unit 25 of the wireless power receiving device 2A places the circuit connection switch Sw in an open state and thereafter ends the operations relating to wireless power reception processing. In this connection, a series of operations relating to wireless power reception processing is executed in the same manner at the other wireless power receiving devices 2B and 2C also.

Therefore, according to the wireless power supply system depicted in FIG. 7, a simpler circuit configuration can be adopted by making a communication function of the wireless power transmitting device 1 and of the wireless power receiving devices 2A to 2C unnecessary. According to this wireless power supply system, even without a communication function, electric power can be efficiently supplied wirelessly in accordance with the circumstances of the wireless power receiving devices 2A to 2C that require electric power.

Note that the present invention is not limited to the above described embodiments.

The configurations illustrated in the above embodiments are mere examples of the present invention, and the designs can be appropriately changed in accordance with specifications.

When generating a magnetic field resonance mode between coils, preferably the axes of the coils are arranged on the same axis as much as possible. Therefore, for example, a configuration may be adopted in which the direction of a coil that participates in electric power supply is forcefully changed, for example, by a posture control device.

As a modification example of a wireless power supply system corresponding to FIG. 1, a variable capacitor may be provided instead of providing a plurality of capacitors. A configuration that changes a reactance of a coil may also be adopted as a configuration for variably controlling a resonant frequency.

As a modification example of a wireless power supply system corresponding to FIG. 4 and FIG. 7, instead of providing a capacitor that has a fixed capacity, as long as there is a certain degree of stray capacitance in the coil, a capacitor need not be particularly provided. This is because a desired resonant frequency characteristic can be obtained by means of the stray capacitance of the coil.

A configuration may also be adopted in which an electronic device other than a battery is directly connected to the wireless power receiving device.

The power supply circuit, the communication unit, and the power receiving control unit may be incorporated into a battery protection LSI which includes a battery protection circuit or the like. In that case, a wireless power receiving device can be realized by using the battery protection LSI in combination with an inductance and a capacitance required for a power receiving resonant circuit and an AC-DC converter.

The communication unit of the wireless power receiving device is not limited to communication with the communication unit of the wireless power transmitting device. For example, the respective communication unit of the wireless power receiving device may be configured to acquire a power receiving status of other wireless power receiving devices based on an electric voltage or an electric current obtained from the power receiving resonant circuit. Alternatively, the respective communication unit may be configured to acquire a power receiving status of other wireless power receiving devices by performing communication with the other wireless power receiving devices.

All examples and conditional languages recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless power supply system, comprising:
   a wireless power transmitting device configured to include a variable resonant circuit including a power transmitting coil and having a variable-controllable resonant frequency characteristic, and to transmit electric power wirelessly via the variable resonant circuit;
   an electromagnetic induction coil, which is included in the wireless power transmitting device, configured to separate from the power transmitting coil by physical distance;
   a plurality of wireless power receiving devices configured to include respective unique resonant circuits having respective unique resonant frequency characteristics which are different to each other, and to wirelessly receive electric power from the power transmitting coil by a magnetic field resonance mode arising as a result of the unique resonant circuit tuning to a resonant frequency of the variable resonant circuit; and
   a communication unit configured to receive information of a resonant frequency transmitted from at least one of the plurality of wireless power receiving devices, and to transmit the received information of the resonant frequency to a power transmission control unit,
   wherein the power transmission control unit is configured to variably control the resonant frequency characteristic of the variable resonant circuit by transmitting alternating current power which matches a unique resonant frequency of the at least one of the plurality of wireless power receiving devices from the electromagnetic induction coil to the power transmitting coil by an electromagnetic induction according to the information of the resonant frequency transmitted from the communication unit.

2. The wireless power supply system according to claim 1, wherein:
   the variable resonant circuit is configured to include a power transmitting coil and a plurality of capacitors of different capacitances which are selectively connected to the power transmitting coil; and the power transmission control unit is configured to selectively control connection of the plurality of capacitors to the power transmitting coil.

3. The wireless power supply system according to claim 2, wherein
   each of the unique resonant circuits is configured to include a capacitor, capacitance of the respective capacitors being mutually different, and a power receiving coil connected to the capacitor.

4. The wireless power supply system according to claim 1, wherein:
   the power transmission control unit, when the communication unit receives a plurality of power transmission requests in an overlapping manner, tunes the alternating current frequency to the resonant frequencies of the corresponding wireless power receiving devices in the order in which the power transmission requests are received or match the resonant frequencies in a cyclical manner by means of time sharing processing.

5. A wireless power supply system, comprising:
   a wireless power transmitting unit configured to include a variable resonant circuit including a power transmitting coil capable of transmitting electric power as magnetic field energy, the variable resonant circuit having a characteristic of resonating at a first frequency and a second frequency, and to transmit magnetic field energy from the power transmitting coil in a resonant state;
   an electromagnetic induction coil, which is included in the wireless power transmitting device, configured to separate from the power transmitting coil by physical distance;
   a first wireless power receiving unit configured to include a first power receiving resonant circuit including a first power receiving coil capable of taking in magnetic field energy, the first power receiving resonant circuit having a characteristic of resonating at the first frequency, and to receive magnetic field energy from the power transmitting coil as electric power by means of the first power receiving coil which resonates with the power transmitting coil and enters a resonant state;
   a second wireless power receiving unit configured to include a second power receiving resonant circuit including a second power receiving coil capable of taking in magnetic field energy, the second power receiving resonant circuit having a characteristic of resonating at the second frequency, and to receive magnetic field energy from the power transmitting coil as electric power by means of the second power receiving coil which resonates with the power transmitting coil and enters a resonant state; and
   a communication unit configured to receive information of a resonant frequency transmitted from at least one of the first wireless power receiving unit and the second wireless power receiving unit, and to transmit the received information of the resonant frequency to a power transmission control unit,
   wherein the power transmission control unit is configured to variably change a resonance characteristic of the variable resonant circuit to the first frequency or the second frequency by transmitting alternating current power which matches a unique resonant frequency of the at least one of the first wireless power receiving unit and the second wireless power receiving unit from the electromagnetic induction coil to the power transmitting coil by an electromagnetic induction according to the information of the resonant frequency transmitted from the communication unit.

6. The wireless power supply system according to claim 5, wherein:
the power transmission control unit, when the communication unit receives a plurality of power transmission requests in an overlapping manner, tunes the alternating current frequency to the resonant frequencies of the corresponding wireless power receiving devices in the order in which the power transmission requests are received or match the resonant frequencies in a cyclical manner by means of time sharing processing.

7. A wireless power transmitting device, comprising:
a variable resonant circuit configured to include a power transmitting coil and have a variable-controllable resonant frequency characteristic;
an electromagnetic induction coil, which is included in the wireless power transmitting device, configured to separate from the power transmitting coil by physical distance;
a communication unit configured to receive information of a resonant frequency transmitted from at least one of a plurality of wireless power receiving devices, and to transmit the received information of the resonant frequency to a power transmission control unit,
wherein the power transmission control unit is configured to variably control the resonant frequency characteristic of the variable resonant circuit by transmitting alternating current power which matches a unique resonant frequency of the at least one of the plurality of wireless power receiving devices from the electromagnetic induction coil to the power transmitting coil by the electromagnetic induction according to the information of the resonant frequency transmitted from the communication unit, and to wirelessly transmit electric power from the power transmitting coil by causing the resonant frequency to tune to a resonant frequency on the at least one of the plurality of wireless power receiving devices to generate a magnetic field resonance mode.

8. The wireless power transmitting device according to claim 7, wherein:
the power transmission control unit, when the communication unit receives a plurality of power transmission requests in an overlapping manner, tunes the alternating current frequency to the resonant frequencies of the corresponding wireless power receiving devices in the order in which the power transmission requests are received or match the resonant frequencies in a cyclical manner by means of time sharing processing.

* * * * *